United States Patent
Dionne et al.

(10) Patent No.: US 10,323,398 B1
(45) Date of Patent: Jun. 18, 2019

(54) METHOD AND APPARATUS FOR PREVENTION OF TOILET RUNNING

(71) Applicants: Greg Dionne, Jacksonville, FL (US); George Dionne, Jacksonville, FL (US)

(72) Inventors: Greg Dionne, Jacksonville, FL (US); George Dionne, Jacksonville, FL (US)

(*) Notice: Subject to any disclaimer, the term of this patent is extended or adjusted under 35 U.S.C. 154(b) by 0 days.

(21) Appl. No.: 16/163,642

(22) Filed: Oct. 18, 2018

Related U.S. Application Data

(60) Provisional application No. 62/651,759, filed on Apr. 3, 2018.

(51) Int. Cl.
*E03D 1/07* (2006.01)
*F16K 21/18* (2006.01)
*E03D 1/14* (2006.01)

(52) U.S. Cl.
CPC ............ *E03D 1/07* (2013.01); *F16K 21/18* (2013.01); *E03D 1/141* (2013.01)

(58) Field of Classification Search
CPC ...................................................... E03D 1/07
USPC .............................................................. 4/412
See application file for complete search history.

(56) References Cited

U.S. PATENT DOCUMENTS

| | | | | |
|---|---|---|---|---|
| 4,122,564 A * | 10/1978 | Addicks | .................. | E03D 1/145 4/326 |
| 5,105,480 A * | 4/1992 | Howell | .................... | E03D 1/306 4/325 |
| 5,175,893 A * | 1/1993 | Navarrete | ............... | E03D 1/145 4/326 |
| 5,414,877 A * | 5/1995 | Tsai | ........................ | E03D 1/145 4/325 |
| 5,544,368 A * | 8/1996 | Wang | ...................... | E03D 1/145 4/324 |
| 5,836,021 A * | 11/1998 | Davidson | .................. | E03D 5/09 4/411 |
| 7,140,050 B2 * | 11/2006 | Muderlak | ............... | E03D 1/306 4/405 |
| 8,060,954 B2 * | 11/2011 | Antunez | ................. | E03D 5/092 4/390 |
| 8,584,268 B2 * | 11/2013 | Han | ........................ | E03D 1/142 4/405 |

* cited by examiner

*Primary Examiner* — Lori L Baker
(74) *Attorney, Agent, or Firm* — Joseph P. Kincart; Rogers Towers, P.A.

(57) ABSTRACT

Apparatus and method for preventing a toilet from running. The apparatus comprises a hollow, cylindrical tube, with a diameter at least slightly larger than the chain of a toilet tank. The toilet chain is run throughout the tube, fixing critical links of the chain in place. This is desirable to prevent the chain from catching on the toilet piston or rod, both of which are leading causes of toilets running.

12 Claims, 5 Drawing Sheets

METHOD AND APPARATUS FOR PREVENTION OF TOILET RUNNING

FIELD OF THE DISCLOSURE

The present disclosure relates to a method and apparatus for prevention of toilet running.

BACKGROUND OF THE DISCLOSURE

The flush toilet is an ancient sanitation invention, with evidence of its use found even in Neolithic times. Flush toilets use gravity to refresh the water in the toilet bowl upon flushing. Typically, a toilet tank comprises a tank (or cistern), a bowl, and a handle. An inlet valve within the tank controls the water supply coming into the tank. If the tank is empty, then the inlet valve is open, allowing water to flow in. A float ball attached to the inlet valve by a float rod rises as water flows into the tank. When the tank is full, the float rod is pressing against the inlet valve hard enough to stop the flow of water from the inlet valve.

In typical household embodiments, the handle is attached by a chain to a piston (or flapper) controlling flow of water from the tank to the bowl. The piston plugs a hole leading from the tank to the bowl. When a user pulls the handle, the chain pulls up on the piston, forcing water through a siphon into the bowl. The piston is usually covered by a plastic membrane, which is constructed to be sucked out of the way by the emptying siphon tube water, allowing the rest of the water in the tank to rush past the piston, and over the top of the siphon, emptying the rest of the tank. The piston membrane then drops back onto the piston, ready for the next flush operation, and the chain usually falls to rest near the piston. See generally *Wikijunior: How Things Work/Flush Toilet*, WIKIBOOKS, https://en.wikibooks.org/wiki/Wikijunior: How_Things_Work/Flush_Toilet (last visited Mar. 30, 2018).

However, occasionally the chain catches on the float lever or on or under the piston. As a result, the piston does not fully reseal, and water can freely move (albeit at a slower flow rate) from the bowl to the tank. This is one of the main causes of toilets "running."

SUMMARY OF THE DISCLOSURE

Accordingly, the present invention provides a method and apparatus for preventing toilets from running due to the chain catching.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure.

DETAILED DESCRIPTION

The present disclosure provides generally for methods and an apparatus for preventing toilets from running. According to the present disclosure, the apparatus slips around the toilet chain. This has three desirable effects. First, it creates a smooth, cylindrical surface around the chain that cannot catch on any other element within the tank. Second, it increases the chain's effective diameter marginally. Finally, it also prevents free movement of certain critical links in the chain, to prevent the chain slipping into the gap underneath the piston.

In the following sections, detailed descriptions of examples and methods of the disclosure will be given. The description of both preferred and alternative examples though through are exemplary only, and it is understood that to those skilled in the art that variations, modifications, and alterations may be apparent. It is therefore to be understood that the examples do not limit the broadness of the aspects of the underlying disclosure as defined by the claims.

Figure 1:
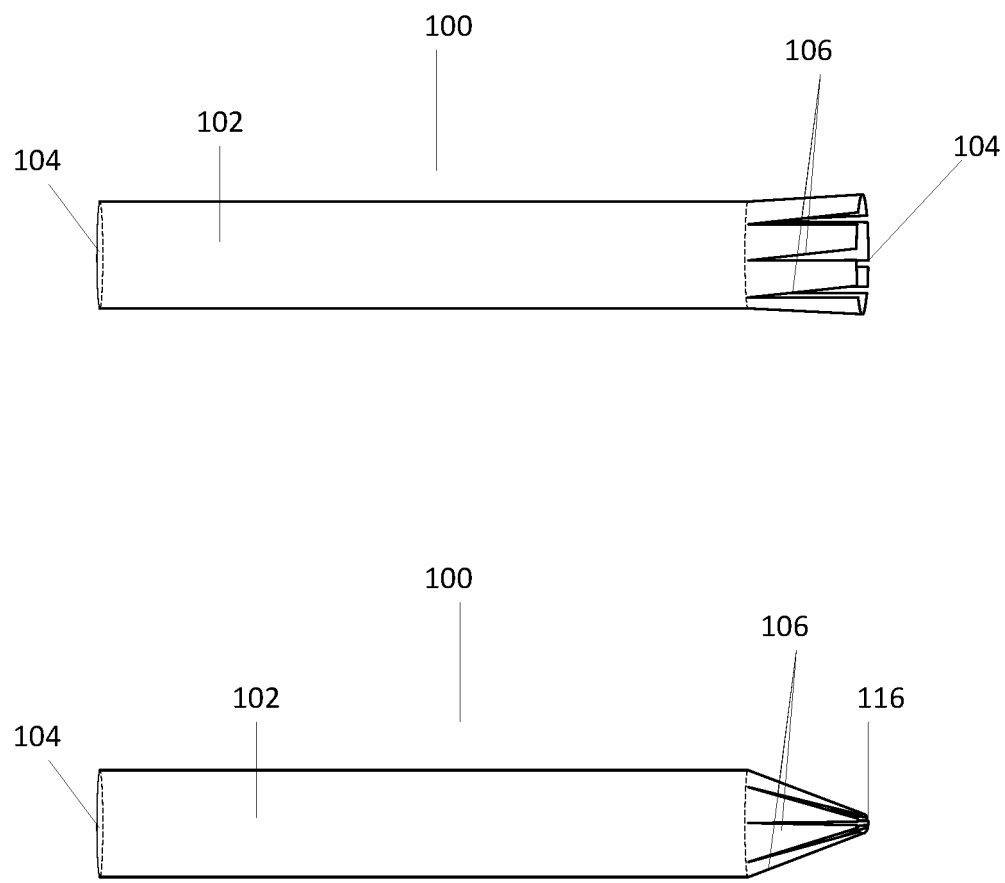
FIG. 1 illustrates an exemplary embodiment of the apparatus for preventing toilets from running.

Referring now to FIG. 1, an exemplary embodiment of the apparatus 100 is shown. The apparatus 100 comprises a hollow cylindrical tube 102 with an interior arcuate wall and an exterior arcuate wall, and at least one end 104 of the tube open. Other tube shapes may include, for example, quadrilaterals, pentagons, hexagons, or any other polygon. In exemplary embodiments, the tube 102 has an inside diameter marginally greater than the width of the toilet float chain links; for example, an inside diameter roughly 10% as large as the width of the toilet float chain links. Generally, the inside diameter is capable of sliding readily over a toilet float chain. One or more tubes are positioned over the chain to prevent the chain from kinking or becoming lodged under an associated float.

The tube 102 may be constructed from a variety of waterproofed materials, including without limitation plastic, polyvinyl chloride, and polyurethane. The diameter of the at least one end 104 must also be at least as great as the width of the toilet chain links, either statically or by temporary stretching. In some embodiments, a surface of the tube is relatively smooth, such that movement through water in the tank produces essentially minimal drag. Other embodiments may include a finned surface to introduce drag.

In some embodiments, at least one end of the tube 102 is cut into a plurality of strips 106 of tubing material. This simplifies the process of attaching the apparatus 100 to the toilet chain. In some embodiments, after the apparatus 100 has been placed on the toilet chain, the strips 106 are stuck together by a waterproof adhesive means, such as glue, to form a point 116. The point structure 116 is optimal to secure the apparatus 100 on the toilet chain and reduce the likelihood of the apparatus 100 moving through the toilet chain. This is desirable to minimize the risk that the apparatus 100 itself might interfere with proper operation of the piston.

Figure 2:
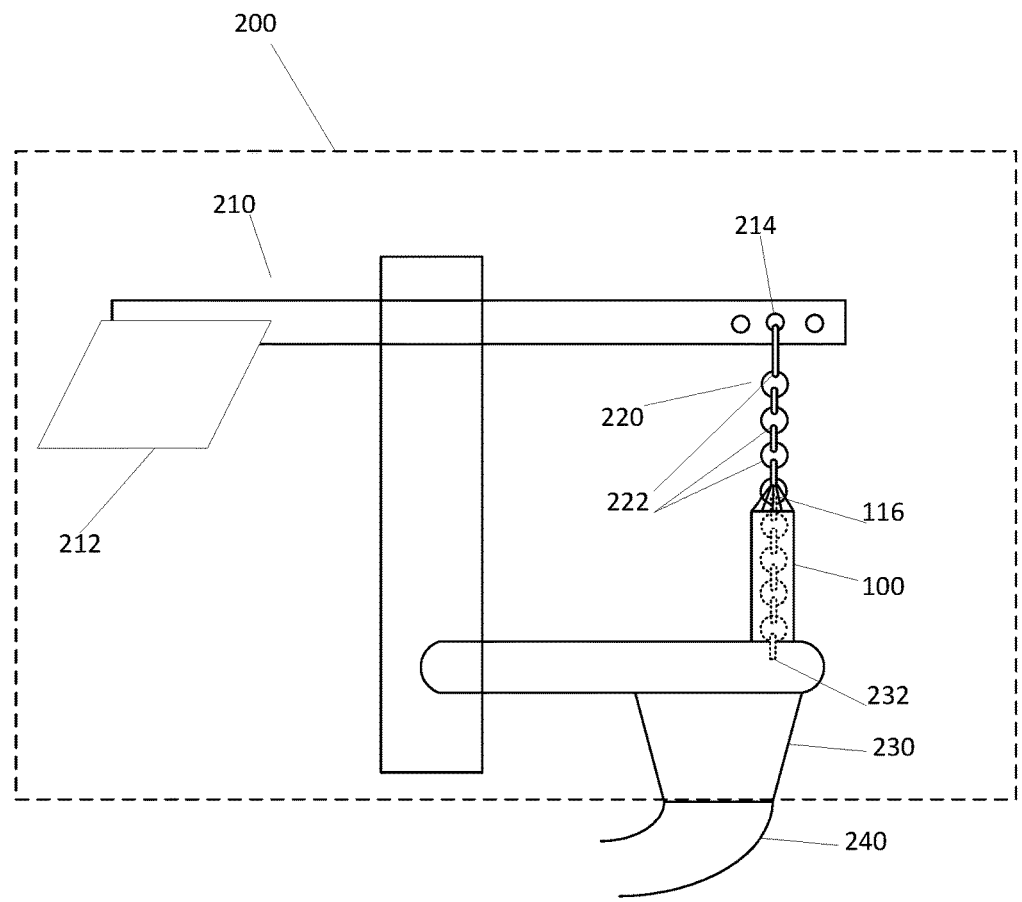
FIG. 2 illustrates an exemplary embodiment of the apparatus as installed on a toilet chain.

Referring now to FIG. 2, an exemplary embodiment of the apparatus 100 as it would sit in a toilet tank is shown. FIG. 2 illustrates a typical interior of a toilet tank (not shown). The major elements of the interior of a toilet tank include a piston 230, a chain 200, and a leverage rod 210. A typical flushing operation involves a user pushing down on a handle 212, causing upward pressure on the rod 210 and consequently the chain 220, which is attached to the rod 210 at 214 and the piston 230 at 232. The upward pressure from the chain 220 causes the piston 230 to rise up as well, allowing water to flow from the tank through the pipe 240.

FIG. 2 demonstrates the utility of the present invention. Because the points of the apparatus 100 are stuck together at point 116, the apparatus 100 is held in place with respect to the chain 200. The apparatus 100 allows for reduced play among the chain links 222, thus preventing any bunching of the chain links 222 that might interfere with the smooth operation of the piston 230 or the lever 210.

It should be noted that although some specific embodiments have been illustrated, other embodiments are within the scope of the invention and may include other apparatus for allowing reduced play along chain links 222. Exemplary embodiments may therefore include one or more of: shrink tubing over specified chain links 222, wherein the shrink tubing may be placed over a perimeter of the chain and shrunk to tightly fit on the chain links 222. Still other embodiments may include a chenille stem that interweaves into the chain links 22 and thereby decreases chain link 222 movement capable of tangling the chain links 222. Other apparatus for decreasing chain link entanglement may also be used.

Figure 3:
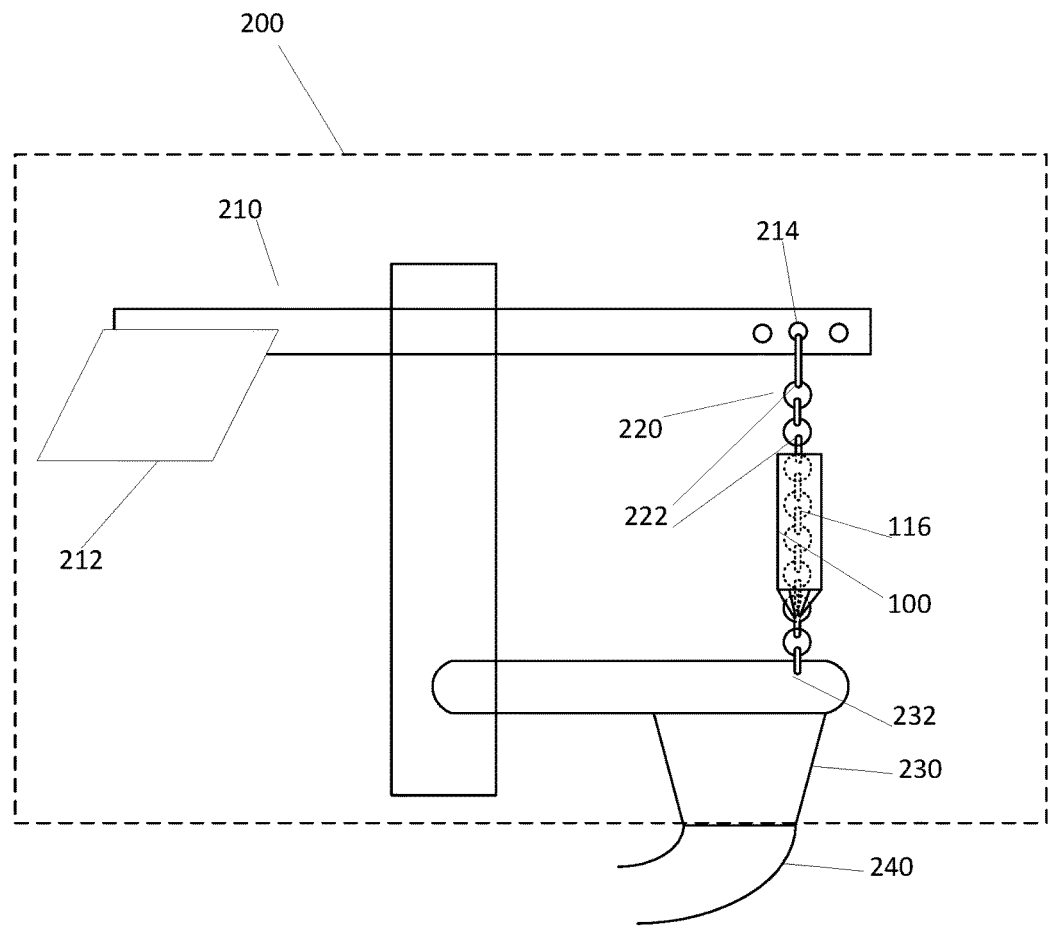
FIG. 3 illustrates an alternative embodiment of the apparatus as installed on a toilet chain.

Referring now to FIG. 3, an alternative embodiment of the apparatus as installed in a toilet is shown. Here, the apparatus 100 is flipped upside down relative to its position in FIG. 2. This allows for an improved grip of the apparatus 100 on the chain links 222.

Figure 4:
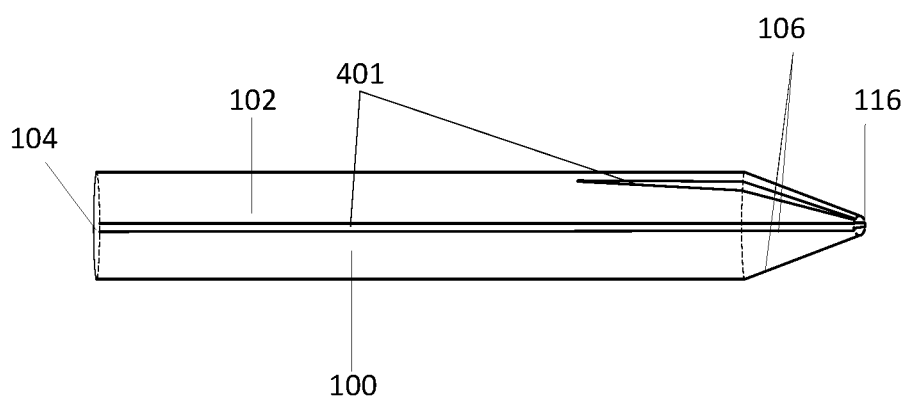
FIG. 4 illustrates an alternative embodiment of the apparatus for preventing toilets from running.

Referring now to FIG. 4, an alternative embodiment of the apparatus is shown. In this embodiment, the apparatus 100 has one or more strips of material 401 cut from the side of the apparatus 100. This may enable better grip on the chain links 222, or allow for an improved ability to prevent interference by the apparatus 100 with the piston 230 or lever 210.

Figure 5:
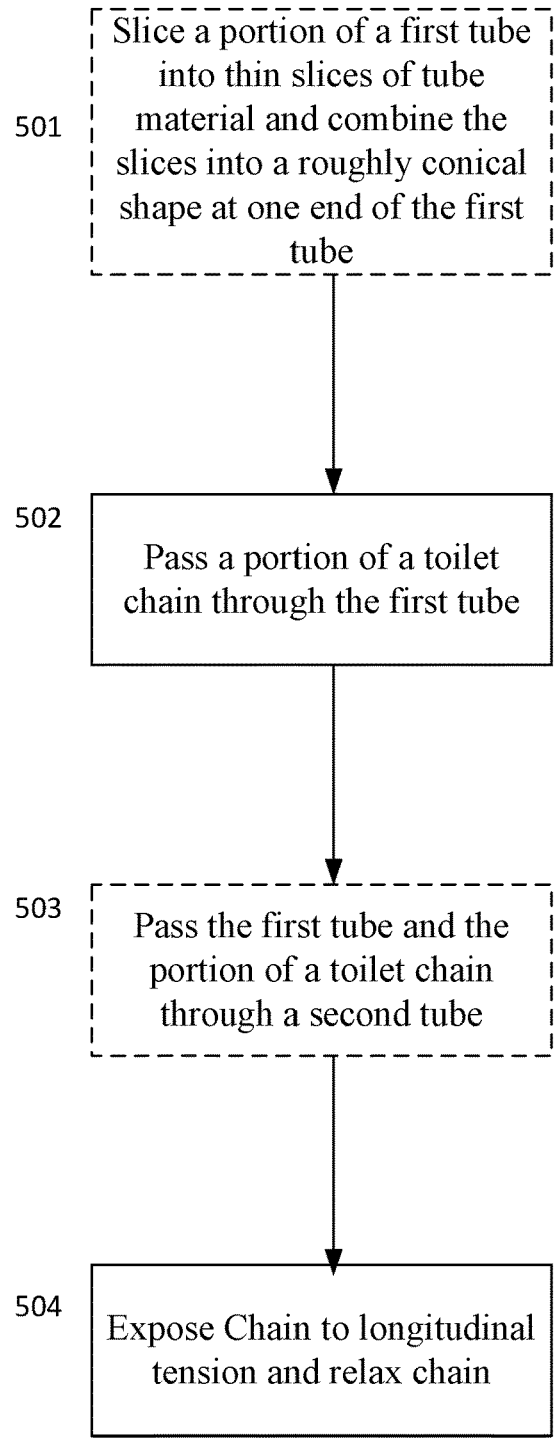
FIG. 5 illustrates an exemplary embodiment of a method for preventing toilets from running.

Referring now to FIG. 5, an exemplary embodiment of a method for preventing toilet running 500 is shown. At optional step 501, a portion of a first tube having a first end and a second end is sliced at one of the first end and the second end with multiple longitudinal cuts along the cylinder with thin slices of tube material. In exemplary embodiments, the first tube is a hollow, cylindrical tube with an interior arcuate wall and an exterior arcuate wall. Other tube shapes may include, for example, quadrilaterals, pentagons, hexagons, or any other polygon. In exemplary embodiments, the tube 102 has an inside diameter marginally greater than the width of the toilet float chain links; for example, an inside diameter roughly 10% as large as the width of the toilet float chain links. Generally, the inside diameter is capable of sliding readily over a toilet float chain. One or more tubes are positioned over the chain to prevent the chain from kinking or becoming lodged under an associated float.

In exemplary embodiments, the slices will be approximately uniformly spaced. For example, if the first tube has a circumference of C, then the tube may be cut at intervals of C/6 to achieve six longitudinal slices. In exemplary embodiments, the slices have a uniform, relatively short length. For example, a slice may begin at one end of the tube and end at a point approximately 5% of the length of the tube from the sliced end. This creates a tube similar to the one depicted in FIG. 1, with a plurality of tube material strips at one end of the tube. In some embodiments, these longitudinal strips may then be arranged to form a conical shape with a common point to create a pencil-shaped tube. In other embodiments, one end of the tube may be compressed prior to slicing, and the slices may be slanted to form the conical shape.

At step 502, a portion of a toilet float chain is passed through the first tube. A toilet float chain generally comprises a chain that is attached at one end to a toilet handle (or an apparatus connected to the handle, so that raising of the handle exerts tension extending the chain and raising one end of the chain first and continuing raising of the handle causes the entire chain to be raised in a longitudinal fashion), and at the other end to the toilet float. The chain may be removed from one of these two securing points and fitted with the first tube. In embodiments invoking optional step 501, the point of the conical portion of the first tube secures the tube to one or more links of the toilet float chain. The point may point upward, toward the handle of the toilet, or downward, toward the toilet float. In some embodiments, the first tube may comprise a hinge, and secured to the chain by opening the first tube, placing a portion of the interior arcuate wall of the first tube around the toilet float chain, and closing the first tube. In some embodiments, the first tube may be placed sufficiently close to the float to prevent the chain from catching under the float. In other embodiments, the first tube may serve to prevent kinking of the chain.

At optional step 503, the toilet float chain and secured first tube may be passed through a second tube. The second tube, which also comprises interior and exterior arcuate walls, may have an interior diameter of between 5% and 15% the measure of the exterior diameter of the first tube. The second tube may serve to secure the first tube, and may provide additional protections against kinking of the toilet float chain.

At step 504, the chain is exposed to longitudinal tension and then relaxed with no entanglement of chain links.

CONCLUSION

A number of embodiments of the present disclosure have been described. While this specification contains many specific implementation details, there should not be construed as limitations on the scope of any disclosures or of what may be claimed, but rather as descriptions of features specific to particular embodiments of the present disclosure. While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modification, equivalents and alternatives falling within the spirit and scope of embodiments of the present disclosure as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while method steps may be depicted in the drawings in a particular order, this should not be understood as requiring that such operations be performed in the particular order shown or in a sequential order, or that all illustrated operations be performed, to achieve desirable results.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. Nevertheless, it will be understood that various modifications may be made without departing from the spirit and scope of the claimed disclosure.

What is claimed is:

1. Apparatus for limiting toilet running, the apparatus, comprising:
    a leverage rod;
    a handle attached fixably to a first end of the leverage rod;
    a toilet chain with a first end attached nearly to a second end of the leverage rod;
    a piston attached to a second end of the toilet chain; and
    a hollow, roughly cylindrical smooth plastic tube attached around the toilet chain such that some links of the toilet chain are contained within the smooth plastic tube, and wherein the smooth plastic tube comprises an opening on at least a first end, having a diameter slightly larger than diameter width of the toilet chain, and a second end comprising multiple strips forming a point and removably securing the tube to the toilet chain.

2. The apparatus of claim 1, wherein the second end of the tube is sliced into thin lateral slices of tube material and the point is directed towards the end of the toilet chain attached to the leverage rod.

3. The apparatus of claim 2, wherein the lateral slices are combined together in a conical shape, with a hollow point formed by adhesive, and at least one of the slices intersects a link of the toilet chain.

4. The apparatus of claim 3 wherein the tube is made from polyurethane.

5. The apparatus of claim 3, wherein the tube is made from polyvinyl chloride.

6. A method for preventing a toilet from running, which method comprises the steps of attaching a handle to a first end of a leverage rod; attaching a toilet chain to a second end of the leverage rod; passing a portion of a toilet chain through an opening of a first end of a smooth plastic tube and out of a second end of the smooth plastic tube, wherein the first end of the smooth plastic tube comprises a diameter slightly larger a width of the toilet chain and the second end of the smooth plastic tube comprises multiple strips formed into a conical shape; and positioning the conical shape pointing upward towards the leverage rod while the toilet chain is within the smooth plastic tube.

7. The method of claim 6, wherein the method further comprises the step of: slicing a portion of the first tube into thin slices of tube material prior to passing the toilet chain through the tube.

8. The method of claim 7, wherein the method further comprises combining the thin slices of tube material together in the conical shape, with a point formed by adhesive, and wherein the point rests on a toilet chain.

9. The method of claim 8, wherein the slices of tube material comprises five percent or more of a length of the smooth plastic tube.

10. The method of claim 9, wherein the tube is made from polyurethane.

11. The method of claim 6, wherein the tube is made from polyvinyl chloride.

12. The method of claim 6, wherein the method further comprises the step of fitting over the first smooth plastic tube, a second smooth plastic tube having a diameter between 5% and 15% larger than a diameter of the first tube.

* * * * *